United States Patent

[11] 3,579,035

| [72] | Inventors | Pierre Burnier<br>Thairy;<br>Jack Moreau, Orsay, France |
|---|---|---|
| [21] | Appl. No. | 763,251 |
| [22] | Filed | Sept. 27, 1968 |
| [45] | Patented | May 18, 1971 |
| [73] | Assignee | Societe Generale de Constructions<br>Electriques et Mecaniques (Alsthom)<br>Paris, France |

[54] SYSTEM FOR DETECTION OF TRANSITION BETWEEN SUPERCONDUCTIVE AND RESISTANT STATE IN SUPERCONDUCTIVE COILS
5 Claims, 10 Drawing Figs.

| [52] | U.S. Cl. | 317/13, 307/306 |
|---|---|---|
| [51] | Int. Cl. | H02h 3/28 |
| [50] | Field of Search | 317/27, 13.4, 13; 307/306 |

[56] References Cited
UNITED STATES PATENTS

| 2,676,284 | 9/1950 | Bechberger | 317/13 |
|---|---|---|---|
| 3,214,637 | 10/1965 | Persson | 317/13.4 |

Primary Examiner—J. D. Miller
Assistant Examiner—Harry E. Moose, Jr.
Attorney—Stephen H. Frishauf

ABSTRACT: An auxiliary winding is located adjacent the main winding of the superconductive coil, the flux relationship between the flux generated by the main winding and by the auxiliary winding being a predetermined factor, for example unity or a whole number factor of proportionality; upon transition from superconductive to resistant state of any portion of the main winding, the IR drop in the superconductive winding will appear as a signal between the superconductive winding and the auxiliary winding, irrespective of inductive voltages. This signal is compared with a voltage drop across a resistance in the supply of the main winding to obtain an alarm which can be used to disconnect the superconductive coil from a supply.

Patented May 18, 1971 3,579,035

SYSTEM FOR DETECTION OF TRANSITION BETWEEN SUPERCONDUCTIVE AND RESISTANT STATE IN SUPERCONDUCTIVE COILS

The present invention relates to a system for the detection of transition between superconductive state and resistive state of superconductive coils, and more particularly to a safety and alarm-indicating and circuit-breaking arrangement to detect change of a superconductive conductor to a resistive state.

Large magnets producing heavy magnetic fields can be constructed by using superconductive techniques. The electromagnetic energy will be large and the damage which may result from transition of the superconductive winding to resistive state may be extensive. This damage may result from carbonization of insulators, fusion of conductors and deformation of mechanical supports, all of which are extensive and difficult to repair, as well as resultant unsafe conditions due to rapid evaporization of a large quantity of liquid helium or other cryogenic fluid.

It is necessary to be able to detect transition of any portion of a superconductor as soon as this transition occurs, from superconductive to resistive state. If the length affected by the transition is small, remedial measures may still be taken. The total length, however, of superconductive windings in powerful magnets may be substantial. Yet, the resistance of the short length of superconductor, even when in the resistive state, may be very small, since the sheathing of superconductive wire is by a very pure metal which, in turn, in the liquid helium also reveals a very small resistance.

The resistive voltage drop, that is the IR drop, to be detected upon a transition is thus very small, in the order of a millivolt or fraction of a millivolt. The self-induced potential, that is the voltage drop due to self-induction ($L \cdot dI/dt$) which appears at the terminals of the winding is, however, substantial and often in the order of several tens, or more of volts. If the current through the superconductive coil is varied to obtain a constant field, potential drops will likewise appear across the the terminals during the variations, until a steady state is again obtained.

It is thus necessary to detect the resistive voltage drop in the order of a minor fraction of a millivolt, for example in the order of hundredths millivolts, which might indicate a change of a portion of the superconductor to resistive state, entirely apart from the potentials due to self-induction.

Detection systems have been proposed which operate by providing an opposing tension by splitting the winding into two parts, so that the self-induced tension of one part ($L_1 dI/dt$) will be balanced by the self-induced potential of the other portion of the winding ($L_2 dI/dt$). The resistive component of the voltage drop, which could be produced in case of local transition of one of the two parts of the windings can then be detected.

This system has various drawbacks, the most important one being that it is extremely difficult to wind superconductive windings so that their self-induced potentials will be the same to an accuracy of $10^{15}$ to $10^{16}$ volts. Such voltage drops may appear already among the external connections to the various parts of the windings, the resistance changes of which are to be detected. Additionally, the electromagnetic forces, which are often variable, and which are developed when the coil is first energized, cause deformations of the coils, which may be random; in order to operate such a system it is thus necessary that the two parts of the winding have a self-inductance which is accurate to within $10^{15}$ to $10^{16}$ volts with respect to each other, even after the windings are repeatedly energized and deenergized. It is also inconvenient to slit the winding into two parts and to bring out of the cryostat the terminals of the two parts, since very high tension may occur at these terminals in the course of a transition. A transition detector, as well as the connections which connect with the windings in the cryostat itself thus must carry, without damage, very high tensions which may, momentarily rise to thousandths of volts. Additionally, if it should occur that both parts of the coil are subject to resistive transitions, the indicator will not function properly.

It 43 therefore an object of the present invention to provide an indicator and alarm system which indicates transition of a superconductive coil, or part thereof, to resistive state and which is simple to construct and efficient in operation.

SUBJECT MATTER OF THE PRESENT INVENTION

Briefly, an auxiliary winding is provided located adjacent the coil of the main winding, to be protected, and so arranged and disposed that the flux cutting of the wires of the auxiliary winding, with respect to all of the turns thereof, is equal to, or proportional by a predetermined factor of proportionality, to the flux cutting all the turns of the main winding. A difference in potential between the two windings, (after compensation for inequality in accordance with the factor of proportionality, if used) then will indicate an IR drop in the superconductive winding, since the potential due to self-induction of the main winding and the auxiliary winding will be the same. This potential difference is compared with the IR drop across a standard resistance in the supply circuit to the coil, and if in excess of a predetermined amount, controls a relay to disconnect the coil.

Only the difference in potential between the main winding and the auxiliary winding is relevant, and is being measured, to effect an indicating or control function; the absolute value of the potential is not needed for the measurement and control function.

The structure, organization and operation of the invention will now be described more specifically with reference to the accompanying drawings, wherein.

Only so much of the circuit as is necessary for an understanding of the invention is illustrated. The coils may be arranged in accordance with known techniques, for example as described in: "Superconducting Magnet Technology" by Charles Laverick, prepared by request of Institute of Extreme Temperatures, Moscow, U.S.S.R.—1968, High Energy Physics Division, Argonne National Laboratory, Argonne, Ill.

Figure 1:
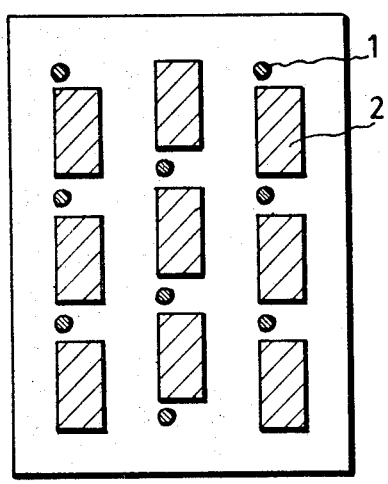
FIGS. 1 and 2 are a schematic representation, in axial cross section, of a superconductive winding in accordance with the present invention.
Figure 2:
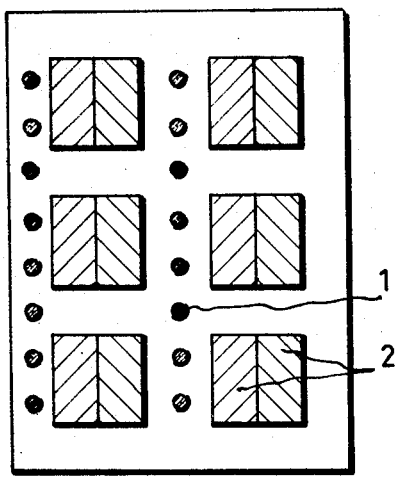

Referring now to the drawings, and particularly to FIGS. 1 and 2, in which electrical insulators, mechanical supports, cooling channels and cryostatic arrangements have been left off for ease of illustration, particularly since they are described in the above-referred to literature reference: The main coil 2 of superconductive material has associated with it an auxiliary winding or coil 1. The winding or coil 1 is so located with respect to the windings of coil 2 that it is immediately adjacent thereto. This spatial relationship can be obtained in various ways, and is indicated in detail in FIGS. 3 to 7. The main winding 2 and the auxiliary winding 1 can be wound at the same time. The two windings are electrically insulated from each other. The auxiliary winding may, for example, be merely a wire of enameled copper, or may be a superconductive wire, covered with copper, and insulated, for example by enamel. The number of turns of the auxiliary winding and the main winding may be the same, or may be of a specific relationship to each other, so that the flux per turn to which the auxiliary winding is exposed with respect to the photomagnetic flux generated by the superconductive winding is predetermined.

As seen in FIG. 2, the windings of the auxiliary coil may be distributed in zones within the main superconductive coil. For example, the turns of the auxiliary winding 1 are arranged to provide one layer of windings for each two layers of windings of the main coil 2; other arrangements may, of course, be utilized within the scope of the present invention, so long as the condition is met that the total flux, with respect to the total number of turns of the auxiliary winding which cuts all of the turns of the auxiliary winding bears a predetermined relationship with respect to the flux generated by the main winding 2.

Figure 3:
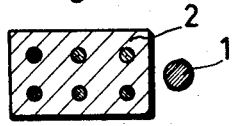
FIGS. 3 to 7 are, in schematic representation, various examples of arrangements of auxiliary and main windings useful in the system of the present invention.
Figure 4:
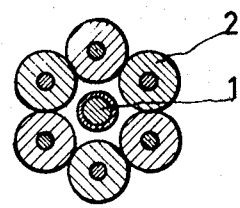

FIG. 3 illustrates an arrangement in which an auxiliary winding 1 is located at the side of a main conductor 2; in FIG. 4, the auxiliary winding forms one strand of a cable of superconductive material, the crosshatched region indicating the superconductive current-carrying element itself and the surrounding bordering element the cooling duct.

Figure 5:
Figure 6:
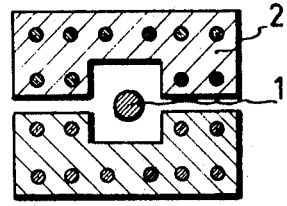
Figure 7:
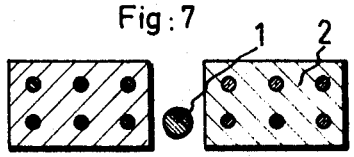

FIG. 5 illustrates another arrangement in which the auxiliary winding 1 is located within a groove, or notch, of the main conductor, containing a plurality of current-carrying wires. As seen in FIG. 6, the main conductor may consist of a pair of elements similar to the arrangement of FIG. 5, located opposite each other, and the auxiliary conductor 1 is placed in a central opening with respect thereto. In FIG. 7, a single auxiliary conductor 1 is located next to a pair of conductors 2.

Figure 8:
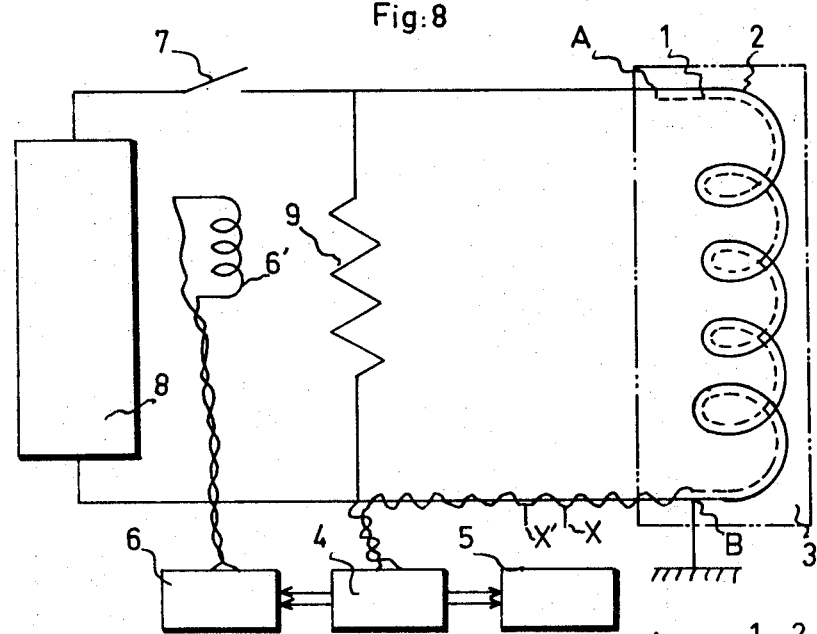
FIG. 8 is an electrical circuit diagram to effect measuring and control function to detect a resistive voltage drop.

An electric circuit diagram to utilize the signal obtained from the auxiliary conductor is illustrated in FIG. 8. Auxiliary winding 1, as well as main winding 2 are connected together at points A, and located within a cryostat, schematically indicated at 3. At the end generally indicated at B, the connections of both the auxiliary and the main winding are taken out of the cryostat, separately, and connected by a twisted line to a utilization and sensing element 4. Unit 4 may be an amplifier having an output connected to a meter, or alarm recorder and indicator 5. Another output may be taken to a relay controller, generally indicated at 6, and connected to a relay coil 6', which controls a power contact to cut power supply to the main winding 2, from a source 8, by opening breaker 7, when the voltage at point B between the windings 1 and 2 exceeds a predetermined level. The electromagnetic energy stored in the coil itself can be dissipated over resistance 9, connected across the main winding 2, and physically located at the outside of the cryostat. If the point B, as indicated in the drawings, is connected to ground or chassis, point A may achieve a high potential, upon interruption of current. However, since the self-induced voltage in coil 1 is exactly equal to that of the self-induced voltage at point 2, utilization apparatus 4 will not be subject to high tension and still indicate only a difference in potential between windings 1 and 2 if the resistance of winding 2 changes due to a transition to resistive state.

Figure 9:
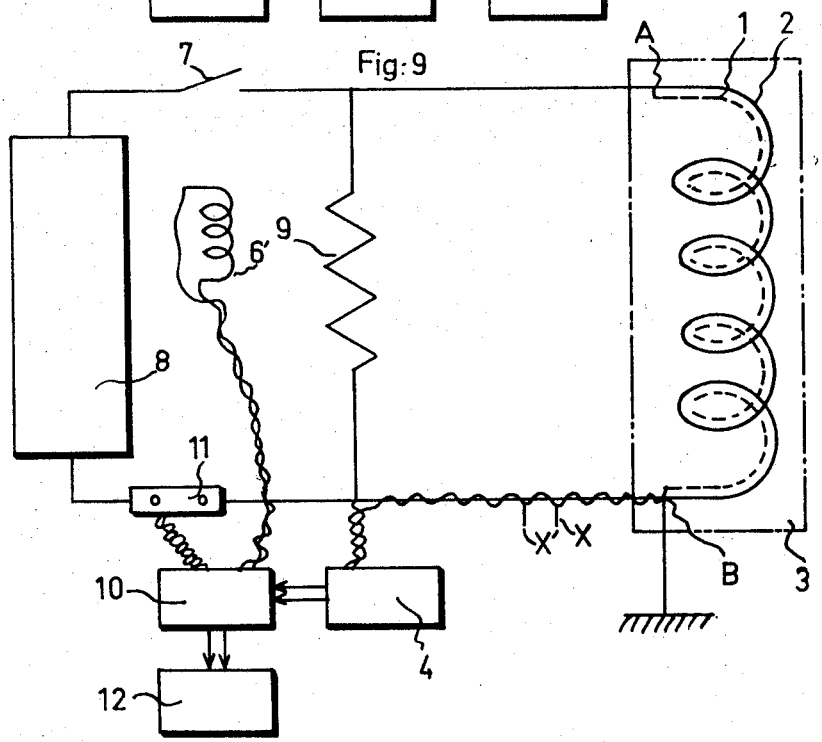
FIG. 9 is another embodiment to effect measuring and control function of the IR component of a superconductive winding.
Figure 10:
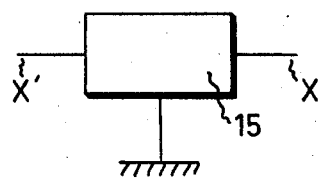
FIG. 10 is a schematic representation of an embodiment utilizing an amplifier.

If the number of turns of auxiliary winding 1 is less than main winding 2, or if the flux cut by auxiliary winding 1 differs from that generated by winding 2, an amplifier having a gain which is the reciprocal of the fraction of voltage induced in winding 1 can be inserted in the connecting line from winding 1 to element 4, for example by breaking the connection at points X–X', and adding an amplifier 15, as schematically indicated in FIG. 10. FIG. 9 illustrates a variation of the circuit of FIG. 8, with the same elements being indicated by the same reference numerals. A resistance of fixed known value 11 is inserted in the power supply circuit, and connected to a comparator 10, which compares the voltage drop across resistance 11 with the voltage occurring, if any, between coils 1 and 2. The output of the comparator 10, again, is used to control an indicator or recorder or other alarm system 12, and further to control coil 6' of the relay to open breaker 7 if comparator 10 detects a prohibited deviation from a predetermined value. Interruption of power supply from power source 8 is similar to that discussed in connection with FIG. 8 and, again, the circuit from winding 1 to element 4 may be broken at points X–X' for insertion of an amplifier. Other circuit breaking and interrupting elements, and circuit arrangement may, of course, be used, as well known in the art.

If, for example, the number of turns of auxiliary winding 1 is half that of the number of turns of main winding 2, the gain of amplifier 15 should be set for two, so that, in case of ordinary normal functioning, the voltage between the main winding 2 and auxiliary winding 1, at point B will be zero.

The system in accordance with the present invention thus permits detection and measurement of resistive faults in superconductive coils and causing an IR drop which may be only in the region of a millivolt, that is, detection of a resistance which may be a fraction of a micro-ohm. This determination and measurement is practically independent of variations of current within the main coil 2 itself, resistance of the auxiliary winding 1, and deformation of the coils due to electromagnetic stresses. None of the measuring instruments, or its auxiliary equipment, is subjected to high tensions, or to self-induced potentials occurring within the windings. The system permits detection of transition of the superconductor to resistive state, without regard to the location of the zone of transition within the superconductor itself, or the specific point within the winding, and further permits detection even if stray resistances, for example due to internal connections, may be present, which stray resistances can readily be balanced out. The insulation between the principal winding 2 and the auxiliary winding 1 need be only minor, since it does not carry substantial potential difference, the potentials between the main winding and the auxiliary winding being practically in equilibrium throughout the extent of the coil.

We claim:

1. System for the detection of transition between superconductive and resistive state of a superconductive coil (2) comprising:

an auxiliary winding (1) located adjacent said coil (2) and so disposed that the total magnetic flux of said auxiliary winding, and the total magnetic flux of said superconductive coil have a predetermined relationship with respect to each other and will develop a first signal from between adjacent end terminals of said coil and said auxiliary winding which is indicative of deviation from said predetermined relationship and hence of resistance transition effects of said superconductive coil;

means (11) deriving a current signal as a measure of the current through said superconductive coil;

a comparator (10) and a relay (6') having a control coil; and means applying said first signal and said current signal to said comparator (10), said comparator comparing said signals and supplying an output signal to the control coil of said relay (6'), said relay having its contacts connected to open the supply to said superconductive coil when said output signal exceeds a predetermined value whereby, when the difference between said first signal and said current signal exceeds a predetermined value, said superconductive coil will be disconnected.

2. System according to claim 1, wherein the means deriving a current signal comprises a resistance (11) in series circuit with the superconductive coil (2), said signal being the IR drop across said resistance.

3. System according to claim 1, including a fixed dissipating resistance (9) connected across said superconductive coil (2).

4. System according to claim 1, wherein said predetermined relationship is a predetermined factor, said auxiliary winding having a lesser number of turns than said coil, said auxiliary winding being located so that the flux cut of said auxiliary winding is equal to the flux cut in said coil; and an amplifier is provided having a gain which is the reciprocal of said factor, said amplifier being connected to have said first signal applied thereto and having its output connected to said comparator.

5. System according to claim 1, wherein said predetermined relationship is a predetermined factor, said auxiliary winding being located so that the flux cutting said auxiliary winding differs from said total magnetic flux of said superconductive coil by a second factor; and an amplifier is provided having a gain which is the reciprocal of said second predetermined factor and the reciprocal of the ratio of numbers of turns of said auxiliary winding and said coil.